United States Patent [19]

Darrow

[11] 4,401,970
[45] Aug. 30, 1983

[54] VITAL LOWEST SPEED COMMAND SELECTOR

[75] Inventor: John O. G. Darrow, Murrysville, Pa.

[73] Assignee: American Standard Inc., Swissvale, Pa.

[21] Appl. No.: 272,841

[22] Filed: Jun. 12, 1981

[51] Int. Cl.³ .............................................. B61L 3/00
[52] U.S. Cl. ................................. 340/47; 246/182 C; 340/62
[58] Field of Search .................... 340/47, 62, 670; 246/182 C, 182 B

[56] References Cited

U.S. PATENT DOCUMENTS

| | | | |
|---|---|---|---|
| 1,678,683 | 7/1928 | Snavely | 246/182 C |
| 1,690,234 | 11/1928 | Lucas | 246/182 C |
| 1,852,409 | 4/1932 | Hailes | 246/182 C |
| 2,811,634 | 10/1957 | Hufnagel | 246/34 |
| 3,500,388 | 3/1970 | Marsh et al. | 340/347 R |

Primary Examiner—Glen R. Swann, III
Attorney, Agent, or Firm—A. G. Williamson, Jr.

[57] ABSTRACT

A separate relay is connected across the output of each speed command filter decoder in the train carried apparatus, except that decoder associated with the highest authorized speed. Each relay has special make-and-break contacts which cannot be simultaneously closed in normal operation. When the relay is energized by an output from the associated decoder, the normally open contacts close to apply that speed command to the corresponding input of the speed governor. The associated normally closed contacts open at the same time to remove operating energy from all higher speed decoders to inhibit simultaneous response from any cause. This action assures that the train is controlled by the lowest active speed command if more than one filter decoder inadvertently responds to produce simultaneous speed command outputs.

2 Claims, 2 Drawing Figures

VITAL LOWEST SPEED COMMAND SELECTOR

BACKGROUND OF THE INVENTION

My invention pertains to a vital, lowest speed command selector for train control systems. More particularly, the invention discloses an apparatus arrangement to assure the selection of the lowest active speed command to control a train in the event that more than one allowed speed is registered by the train carried apparatus in a train speed control system.

A speed control system for a train normally includes a wayside arrangement to transmit a selected speed command through the rails, each different command having a distinct code pattern or frequency depending upon the type of system involved. The system further includes apparatus on each train to receive the speed command, such apparatus including frequency sensitive code filters or decoders to determine and interpret which command has been received. Finally, speed governor apparatus is provided, having a separate input from each speed command decoder, which processes and compares the received speed command with a signal indicating the actual train speed to determine if an overspeed condition exists. This governor will hold the train brakes released only when the actual speed is determined to be less than the allowable speed command. These code filters or decoders are designed so that they should never produce an output signal in the absence of the corresponding frequency or code input from the rails. However, to meet added assurance and safety measures which may be required by some installation specifications, it is desirable to be able to assure that, if two code filter, decoder outputs should inadvertently occur simultaneously, the speed governor will receive and respond only to the lower speed command of the two outputs. Therefore, it is advantageous to have a simple circuit arrangement which may be interposed between the bank of filter decoders and the speed governor to assure that the lowest speed filter decoder operating makes all higher speed decoders inoperable.

Accordingly, an object of my invention is a vital lowest speed command selector for a train speed control system.

Another object of the invention is apparatus which assures that only the lowest active speed decoder in a train speed control system is effective to control the speed governor.

A further object of my invention is a simple circuit arrangement which may be interposed between the speed command filter-decoders and the speed governor on a train equipped with a speed control system to vitally guarantee that the lowest operating filter decoder inhibits the operation of all higher speed command filter decoders.

Also an object of the invention is a train speed control arrangement which provides a relay connected to the output of each speed command filter decoder, which relay when energized completes the circuit for applying the speed command output to the train speed governor and further interrupts the supply of operating energy to all filter decoders associated with higher speed commands, to assure that only the lowest detected speed command is effective to control the speed governor and thus the operation of the train.

Other objects, features, and advantages of my invention will become apparent from the following specification and appended claims when taken in connection with the accompanying drawing.

SUMMARY OF THE INVENTION

In practicing my invention, the novel arrangement is interposed between the bank of speed command filter decoders and the speed governor of the train speed control system. The coil of a different relay is connected across the output of each decoder except that representing the highest authorized train speed. Each relay is energized when the associated decoder selectively produces an output to designate the associated speed as that authorized in accordance with the traffic indication received from the wayside. The specific showing is a four-indication system with three speed filter decoders. Thus two relays, one associated with each of the low and medium speed ranges, are used but none is associated with the high speed decoder. In the basic illustration, these relays are of the type that have two pairs of fixed contacts and a movable contact or armature which closes a circuit between one pair or the other of the fixed contacts. In other words, if one pair of contacts is made, that is, the circuit is closed between them by the movable armature, the other pair of contacts cannot be closed unless all four contacts are shorted together by a relay failure which would create an obvious fault indication. One set of contacts is normally closed, that is, when the relay is deenergized, and the other set is normally open and the circuit between them closed only when the relay is energized. This same contact function may also be accomplished, as alternately shown, by using a relay with two front-back transfer contact sets which are connected in series.

The normally open contacts of each relay are inserted in the circuit lead supplying the decoder output speed command to the corresponding input on the speed governor. Thus, this circuit is completed to apply the speed command to the governor only when the associated decoder output actually occurs as indicated by the relay becoming energized. The second or normally closed contacts on the relay, which open when the relay is energized, are used to interrupt the supply of operating energy to all of the filter decoders associated with the higher speed commands. Without operating energy, these filter decoders cannot produce a speed command output for application to the speed governor. Thus, if two decoders simultaneously respond incorrectly to the received wayside indication or to some induced signal, only the output produced by the filter decoder representing or associated with the lower of the two speed commands is effective. In other words, only the circuit for application of the lower speed signal to the speed governor is completed over the closed contacts of the lower speed filter decoder relay. Operation of all of the higher speed filter decoders is immediately inhibited by the interruption of their power supply at now open contacts of this lower speed relay. The response of the train through the actuation of the speed governor and its control is thus within a safe range since the lower or lowest speed only is effective.

BRIEF DESCRIPTION OF THE DRAWINGS

Before defining my invention in the appended claims, I will describe in more specific detail a preferred and an alternate arrangement, as illustrated in the accompanying drawings, in which:

DESCRIPTION OF THE ILLUSTRATED EMBODIMENT

Figure 1:
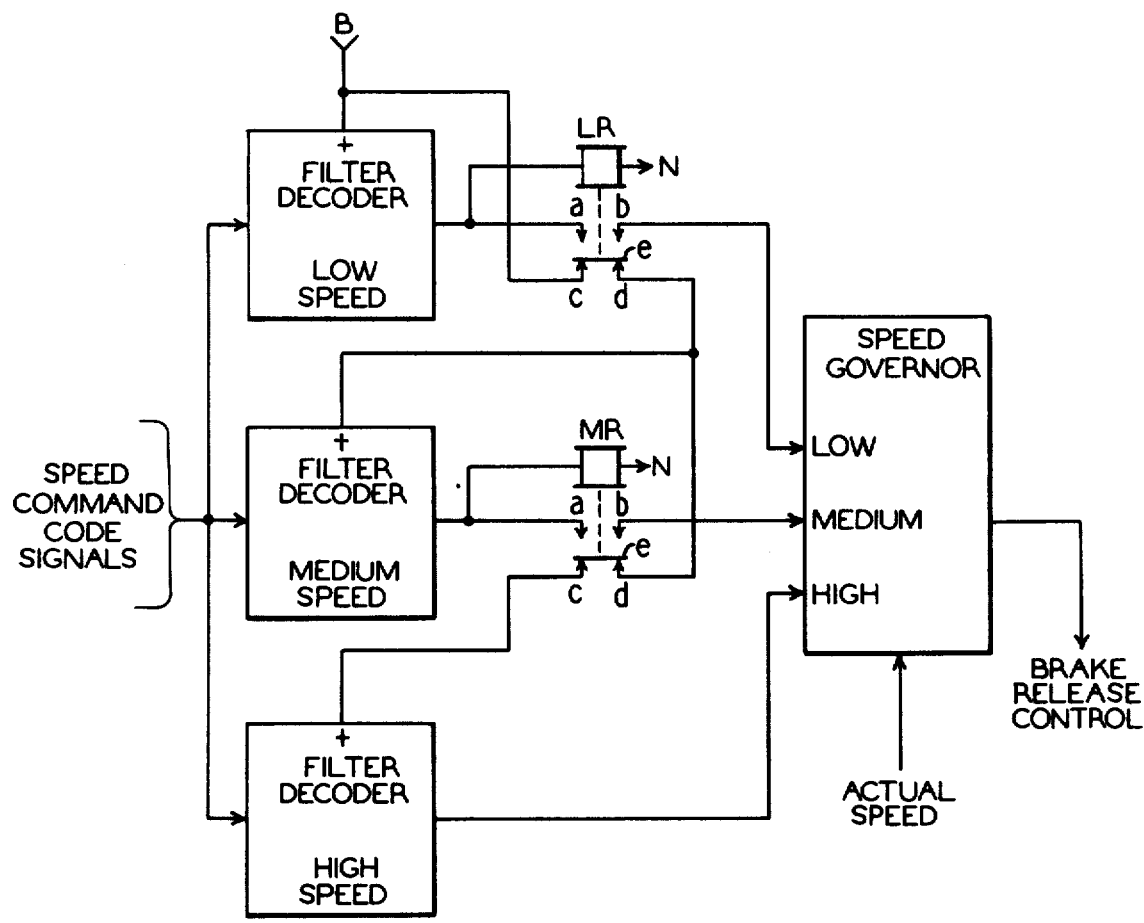
FIG. 1 is a schematic circuit representation of a complete vital speed command selector embodying the invention.

Referring to FIG. 1, the apparatus shown is all carried on board the train as part of the speed control system. A bank of three speed command filter decoders is shown at the left by conventional blocks. These decoders receive a common input of authorized speed command code signals from the wayside through the train control receiver apparatus, as conventionally illustrated by the input lines, in any manner well known in the art. Each filter decoder unit is tuned or designed to selectively respond only to a single predetermined speed command, within the designated range, received as a code signal which may be a unique alternating current frequency, a code pulse rate, or a unique code pattern. The details of the reception and decoding of the speed commands are not critical to this present description and will be understood by those skilled in the art. The apparatus is thus shown only in a conventional manner. It is to be understood that, in spite of a proper code signal input, each filter decoder will produce an output only if it is provided with operating energy from a local direct current source, connections to the positive and negative terminals of which are designated by the references B and N, respectively. A connection at which energy from terminal B of the source is applied to each decoder is illustrated by the + symbol at the top of each conventional block.

At the right, another conventional block is shown which represents the speed governor apparatus for the train. Any one of several types known in the art may be used. A specific example is that shown in my copending application for U.S. Pat. Ser. No. 199,779, filed Oct. 23, 1980, for a Fail-Safe Low-Pass Filtering Circuit. Briefly, the speed governor receives an authorized speed command at one of the indicated inputs from the filter decoder outputs. The governor then compares this input signal with the actual speed measurement input illustrated at the bottom of the block which is supplied in any known manner. If the actual speed is less than or equal to the command speed input, an output from the governor, as indicated, holds the train brakes released. However, if the actual speed signal is greater than the command or authorized speed, no output is produced by the governor and the brake release control is deenergized and the brakes are applied.

Previously, the output of each filter decoder was applied directly to the corresponding input on the speed governor. In the present arrangement, however, a relay and contact network is inserted between the decoders and the speed governor to inhibit the simultaneous application of two speed commands. A special relay is connected to the output of each speed filter decoder except that of the highest authorized speed decoder. In other words, with three decoders shown, relays LR and MR are associated with the low speed and medium speed filter decoders, respectively, but no relay is associated with the high speed decoder. These relays have a special contact structure with an upper pair of fixed contacts a and b and a lower pair of fixed contacts c and d. A movable contact piece or armature e is operated by the associated relay to normally close only the circuit between fixed contacts c and d and, when the relay is energized, to close only the circuit between contacts a and b. The relay is so structured that if the circuit is made between one pair of fixed contacts, the circuit between the other pair cannot be made except by all four contacts becoming shorted or welded together. As will appear shortly, if such a fault occurs, the application of positive energy from terminal B of the source to the speed governor input, which as in the cited example requires a negative input for operation, will inhibit any governor output so that the brakes will be applied, a vital or safe condition.

Figure 2:
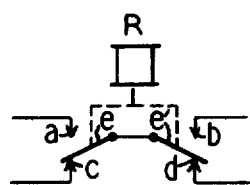
FIG. 2 is a schematic diagram of an alternate relay contact arrangement which may be used as a substitute for each relay shown in FIG. 1.

Referring to FIG. 2, an alternate contact structure is shown for a relay R which then may be substituted for relays such as LR and MR shown in the basic arrangement. Relay R has two transfer contacts, each conventionally illustrated with a single set of dependent front and back contacts between which a movable armature travels and complete circuits as relay R is energized and deenergized, respectively. These fixed contact points are designated front contacts a and b and back contacts c and d to simplify visualization of their substitution into the circuits of FIG. 1. The two contact armatures e and e′ occupy the released position shown when the relay coil is deenergized, closing against associated back contacts so that a circuit is completed between contacts c and d. When the relay coil is energized, both armatures are and must be picked up to close against corresponding front contacts. This completes the circuit from contact a to contact b and of necessarily opens the circuit between contacts c and d. In the following operational description, the alternate use of relays of this type shown in FIG. 2, if desired, will be obvious.

Each relay is connected to the output of the associated filter decoder in such a manner as to be energized when the decoder is active. It may be noted that when the operating energy supplied to the decoder is positive, as in the present situation, in the interest of safety the decoder output has a negative characteristic. This output of opposite polarity is essential to the safety of the entire train control or speed control arrangement, such as indicated in the above-discussed possible relay failure.

In the at-rest conditions, the normally open contacts a and b of each relay interrupt the supply of the speed command output from that decoder to the corresponding input terminal of the speed governor while the normally closed contacts c and d supply operating energy from terminal B of the source to all higher speed filter decoders. Specifically, relay LR is connected to the output of the low speed filter decoder so as to respond to an output from this decoder. This occurs when a low speed code signal is received from the wayside or if, for some reason, the filter decoder responds to an extraneous signal. Thus relay LR picks up with either a proper or an inadvertent output from the low speed decoder, closing the circuit between its upper (front) contacts a and b to complete the application of the decoder output signal to the corresponding terminal on the speed governor. At the same time, the opening of the circuit between lower (back) contacts c and d interrupts the supply of operating energy from terminal B to the medium and high speed filter decoders in an obvious manner so that all of the higher speed decoders are disabled. Thus, even if the response of the low speed filter decoder is incorrect, none of the other decoders can respond to the input signals from the wayside and only the low speed command signal is applied to the speed governor. This latter unit then controls the train movement in accordance with the comparison of the low speed command and the actual speed input.

In a similar manner, if a medium speed code signal is received from the wayside, the output from the medium speed decoder energizes relay MR. The pickup of its movable armature e closes the circuit between its upper (front) contacts a and b to apply the medium speed command to the speed governor which operates accordingly. At the same time, the opening of the circuit between lower (back) contacts c and d of relay MR interrupts the supply of energy from terminal B to the high speed filter decoder. This inhibits its operation and eliminates any output if a false signal response occurs. It is also obvious that, if more than three filter decoders or speed commands are being used, a similar relay and contact arrangement is provided with each other decoder except that associated with the maximum authorized speed.

It is thus apparent that there are several features of this disclosed system which contribute to vitality. First, relays are used with contact structure which can only complete a circuit between one pair or another of isolated pairs of fixed contacts, but cannot make both contact circuits simultaneously without losing separation of the positive and negative energy circuits and thus inhibiting system operation. Second, the arrangement uses one normally closed pair of contacts from each relay to interrupt the power to all filter decoders which represent higher speed commands, that is, which are later in the operating sequence. Finally, the arrangement uses the normally open pair of contacts from each relay to interrupt the supply of the associated decoder output, which has a polarity opposite to that of the power supply, to the speed governor input, thereby checking that the relay is in operating condition. Thus, vitality in the selection of the lowest speed command output against any failure is accomplished using relays which are designed to have certain operating features which can be assured. The vital lowest speed selector of the invention is thus achieved in an economical and efficient manner.

Although I have herein shown and described but one basic arrangement for a vital lowest speed selector embodying the invention, it is to be understood that various modifications and changes may be made therein within the scope of the appended claims without departing from the spirit and scope of my invention.

Having thus described my invention, what I claim as new and desire to secure by Letters Patent, is:

1. In combination with a speed control system on a train which includes a speed governor operable for comparing an authorized speed command with the actual train speed to control train brakes accordingly and a plurality of speed command decoders, each responsive to a distinct received code signal only when supplied with operating energy for producing a different authorized speed command for application to said speed governor; vital lowest speed command selector apparatus comprising,
(a) a relay coupled to each decoder, except the highest speed command decoder, having separate first and second sets of contacts closed only when the relay occupies a first and a second position, respectively, each relay normally occupying its first position and responsive to an output command from the associated decoder for operating to its second position,
(b) a first circuit associated with each relay and controlled by the corresponding second contact set for applying the speed command output of the associated decoder to a corresponding input of said governor only when that relay operates to its second position, and
(c) a second circuit associated with each relay and controlled by the corresponding first contact set for normally supplying operating energy to all higher speed decoders and for interrupting such energy supply to inhibit any speed command output from those decoders when that relay operates to its second position,
(d) any relay operating fault which cross connects the corresponding first and second sets of contacts inhibiting all operation of said speed governor by application of operating energy thereto.

2. Speed control apparatus on board a train comprising,
(a) a plurality of decoders, one for each authorized train speed range, coupled for receiving speed code signals selectively designating an authorized speed,
  (1) each decoder selectively responsive when supplied with operating energy having a first voltage characteristic for producing a speed command output having a second voltage characteristic only when a received speed signal designates the corresponding authorized speed,
(b) a speed governor operable for comparing a received speed command only of said second voltage characteristic and an actual train speed signal and responsive for enabling train movement only when the actual speed is less than the authorized speed,
(c) a relay coupled to each decoder, except the highest speed decoder, and responsive to the speed command output of the associated decoder for operating from a normally occupied first position to a second position,
(d) each relay having a first and a second pair of fixed contacts and a movable armature contactor operable to close separate circuits through said first or said second contact pairs only when said relay is in its first or second position, respectively,
(e) a first circuit associated with each relay and controlled by the corresponding second pair of contacts for applying the speed command output from the corresponding decoder to said speed governor when the relay occupies its second position, and
(f) a second circuit also associated with each relay and separately controlled by the corresponding first pair of contacts for applying operating energy to all higher speed decoders only when that relay occupies its first position,
(g) an operating fault condition in a relay which interconnects said first and second fixed contact pairs of that relay to apply operating energy to said speed governor inhibiting all operation of said governor, thus halting train movement.

* * * * *